United States Patent [19]

Tebb

[11] Patent Number: 4,750,769
[45] Date of Patent: Jun. 14, 1988

[54] AUXILIARY GRAPPLE FIXTURE

[75] Inventor: Barrie F. Tebb, Kleinburg, Canada

[73] Assignee: Spar Aerospace Limited, Mississauga, Canada

[21] Appl. No.: 37,520

[22] Filed: Apr. 13, 1987

Related U.S. Application Data

[63] Continuation-in-part of Ser. No. 852,554, Apr. 16, 1986, abandoned.

[51] Int. Cl.4 ................................................ B66C 1/66
[52] U.S. Cl. .................................. 294/86.4; 244/158 R; 244/161; 294/67.32; 294/81.52; 294/90
[58] Field of Search ........... 294/1.1, 67.1, 67.3–67.32, 294/68.3, 81.1, 81.5–81.53, 81.6, 81.61, 82.24, 82.26, 82.32, 86.4, 90, 106, 113; 244/158 R, 161

[56] References Cited

U.S. PATENT DOCUMENTS

| | | | |
|---|---|---|---|
| 2,904,370 | 9/1959 | Meinholtz | 294/68.3 |
| 3,206,534 | 9/1965 | Vogele et al. | 294/81.61 X |
| 3,261,637 | 7/1966 | Bopp et al. | 294/68.3 |
| 3,352,592 | 11/1967 | Rodgers | 294/81.5 |
| 3,493,258 | 2/1970 | Wyrough | 294/81.53 |
| 3,558,178 | 1/1971 | Taylor | 294/67.32 X |
| 4,056,248 | 11/1977 | Hasquenoph et al. | 294/82.26 X |
| 4,105,241 | 8/1978 | Mee | 294/86.4 |

FOREIGN PATENT DOCUMENTS

| | | | |
|---|---|---|---|
| 1395084 | 5/1975 | United Kingdom | 294/81.61 |
| 557035 | 5/1977 | U.S.S.R. | 294/67.32 |
| 763236 | 9/1980 | U.S.S.R. | 294/81.51 |

Primary Examiner—Johnny D. Cherry
Attorney, Agent, or Firm—Fetherstonhaugh & Co.

[57] ABSTRACT

In a grapple fixture which has a plurality of locating cam arms projecting from the front face of its base for the purpose of aligning it with a grapple device, there is provided the improvement wherein the cam arms are mounted for angular movement on the base, each cam arm being connected to a latch which is located at the back face of the base. The latch is connected to the cam arms so as to be rotatable with the cam arms into and out of a latch receptacle such that the latch is operable from the front face of the base.

13 Claims, 5 Drawing Sheets

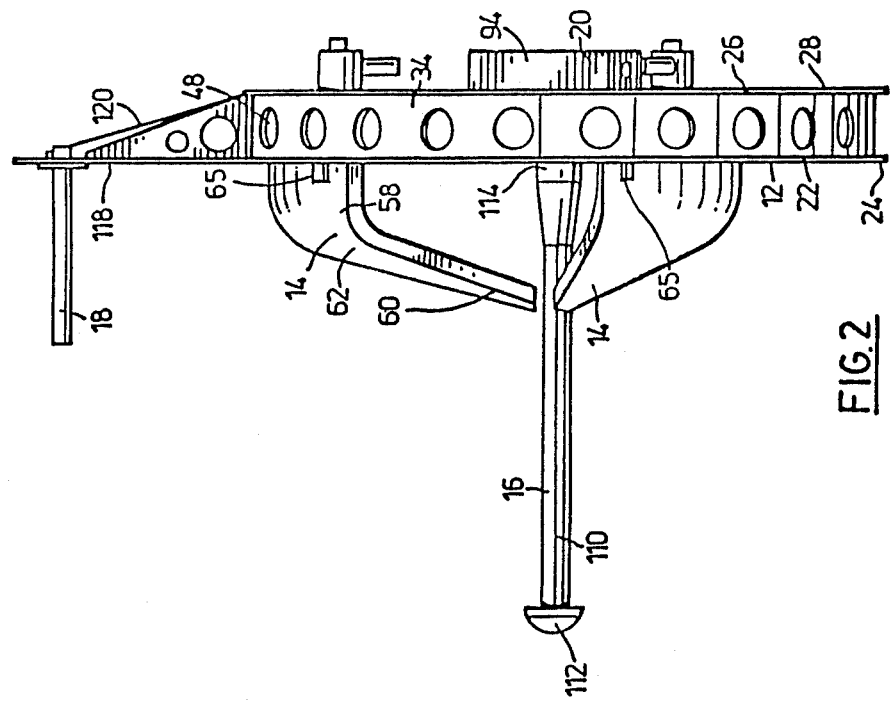

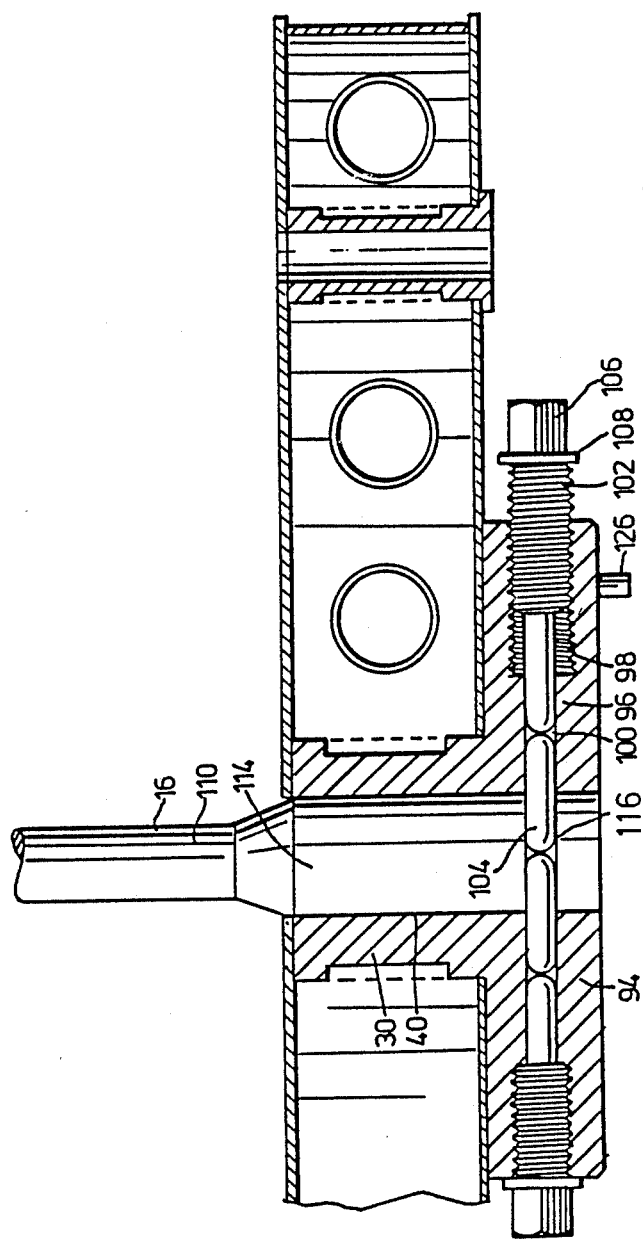

AUXILIARY GRAPPLE FIXTURE

RELATED APPLICATIONS

This application is a continuation-in-part of application Ser. No. 852,554 filed Apr. 16, 1986, now abandoned and upon which priority under 35 U.S.C. 120 is claimed.

This invention relates to grapple fixtures. In particular, this invention relates to a portable grapple fixture which can be readily manipulated into engagement with an adaptor.

PRIOR ART

A grapple fixture of the type to which the present invention relates is described in U.S. Pat. No. 4,105,241 dated Aug. 8, 1978 and assigned to Spar Aerospace Products Limited.

The grapple fixture component of the coupler described in this prior patent is designed to be substantially permanently attached to the payload. These grapple fixtures are quite costly and because of this cost factor, they are sparingly applied to payloads. Furthermore, these grapple fixtures may be quite heavy in relation to the payload to which they are attached and can therefore add a substantial weight to the payload. The grapple fixtures of the type described in the prior patent referred to above are frequently weighed about 27 pounds and in some applications the total weight of the payload to which the fixture is applied may be about 100 pounds with the result that the weight of the fixture constitutes a substantial percentage of the weight of the payload. The payload charges are determined by weight with the result that it is important to minimize the weight of the fixture.

SUMMARY OF INVENTION

It is an object of the present invention to provide a light weight grapple fixture which can be releaseably mounted on a payload.

It is a further object of the present invention to provide a grapple fixture which can be readily manipulated into engagement with a payload by an astronaut in the course of extra vehicular activities (E.V.A.).

According to one aspect of the present invention, there is provided in a grapple fixture having a base which has a front face and a back face and a plurality of locating cam arms projecting from the front face of the base, the improvement wherein said cam arms are mounted for angular displacement on the base between a first position and a second position, latch means located at the back face of said base, said latch means being connected to said cam arms so as to be rotatable with said arms into and out of a latch receptacle such that said latch means is operable from the front face of said base.

According to a further aspect of the present invention, there is provided a grapple fixture assembly comprising an adaptor which is mountable on a payload and has an outer face and a side face which extends about the perimeter of the outer face, a latching notch formed in and extending laterally inwardly from said side face, a grapple fixture comprising a base having a front face and a back face, a cam arm having a distal end and a proximal end, said proximal end being mounted on the base for angular movement with respect to said base, a latch plate mounted on the proximal end of the cam arm and spaced outwardly from the back face of the base, said cam arm being angularly moveable with respect to the base to move the latch plate into a latching notch of an adaptor when the outer face of the adaptor and the back face of the base are arranged in a face-to-face relationship thereby to releasably secure the grapple fixture to the adaptor.

BRIEF DESCRIPTION OF THE DRAWINGS

The invention will be more clearly understood after reference to the following detailed specification read in conjunction with the drawings wherein;

FIG. 1 is front elevation of a grapple fixture constructed in accordance with an embodiment of the present invention, FIG. 2 is a side elevation of the grapple fixture of FIG. 1.

FIG. 6a is a sectional side view illustrating the position of the retaining pins when they are arranged to secure the grapple shaft to the remainder of the grapple fixture.

With reference to FIG. 1 of the drawings, the reference numeral 10 refers generally to a light weight grapple fixture constructed in accordance with an embodiment of the present invention. The grapple fixture 10 comprises a base 12, three cam arm assemblies 14, a grapple shaft 16, a target rod 18 and an EVA release mechanism 20.

Figure 4:
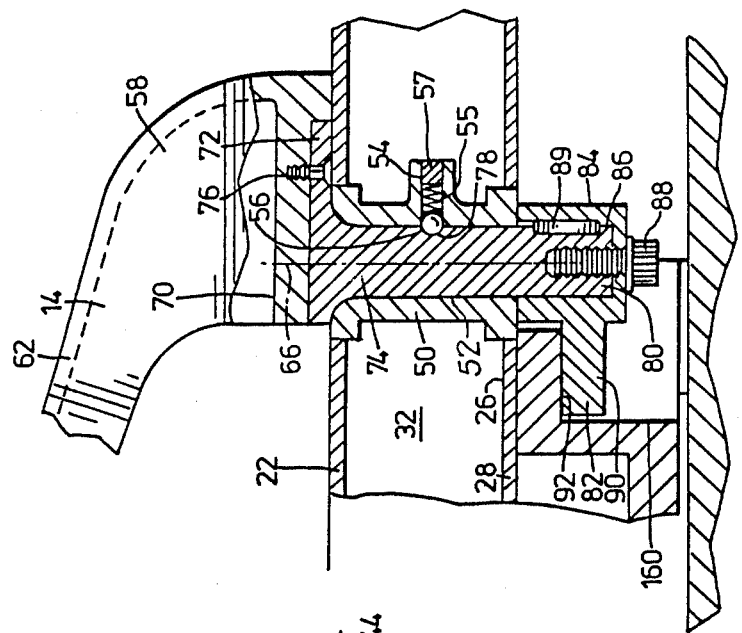
FIG. 4 is a sectional side view illustrating the manner in which the grapple fixture is latched to the adaptor plate.

The base 12 is constructed so as to be light in weight and comprises a front plate 22 which has an outer face 24 and a back plate 26 which has a back face 28. The back plate 26 is circular in shape and has a cylindrical shaped boss 30 located at the centre thereof. Twelve stiffening ribs 32 project radially from the boss 30 and extend to the side wall 34 which extends about the perimeter of the base. The ribs 32 are arranged so that they abut against the inner face of the side wall 34. Cylindrical bosses 36 are located along the length of each second rib 32 and are interconnected by reinforcing ribs 38. The front plate 22, back plate 26, ribs 32 and 120 are made from sheet metal and are dip-braised to be secured to one another. The boss 30 is formed with a through passage 40 and the bosses 36 are formed with passages 42. Weight reducing openings 44 and 46 are formed in the back plate 26. Similarly, weight reducing passages 48 are formed in the ribs 32 and the side wall 34.

Three cam arm mounting bushes 50 (FIG. 4) are mounted in the base plate 12 and are supported by the ribs 32 and 38 and front plate 22 and the back plate 26 as shown in FIG. 4. Each bush 50 has a bore 52 extending therethrough. A passage 54 opens laterally from the bore 52 and a detent ball 56 is retained in the passage 54 by means of a compression spring 55 and a set screw 57.

The cam arm assemblies 14 each comprise an elongated arm 62 which has a proximal end 58 and a distal end 60. The arms 62 extend outwardly from the base 12 generally perpendicular thereto and then extend upwardly and outwardly toward the grapple shaft 16. The outer peripheral edge 64 of the proximal end 58 extends in an arc of curvature which is generated from the axis 66 (FIG. 4). The base 70 of the arm is secured to the head portion 72 of a shaft 74 by means of mounting screws 76. The shaft 74 has a recess 78 formed therein which receives the detent ball 56 when the arms 62 are in the latching position to releasably retain the arms 62 in this position. The shaft portion 74 has an extension 80 of reduced diameter which projects below the back plate 26. A latch plate 82 is formed with a boss portion 84 in which a bore 86 is formed. The extension 80 of the shaft 74 is located in the bore 86 of the latch plate and the latch plate is secured with respect to the extension 80 by means of a mounting screw 88 and a locking key 89. The latch plate 82 has a latch portion 90 which extends radially from the boss portion 84. The latch portion 90 has an upper face 92 which is spaced from the back face 28 of the back plate 26.

Figure 5:
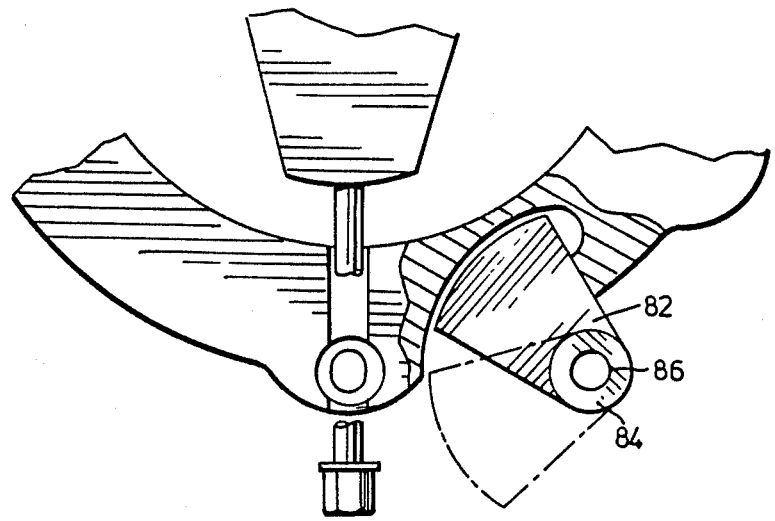
FIG. 5 is a partially sectioned partial front elevation showing the movement of the latch plate into and out of engagement with the base.
Figure 7:
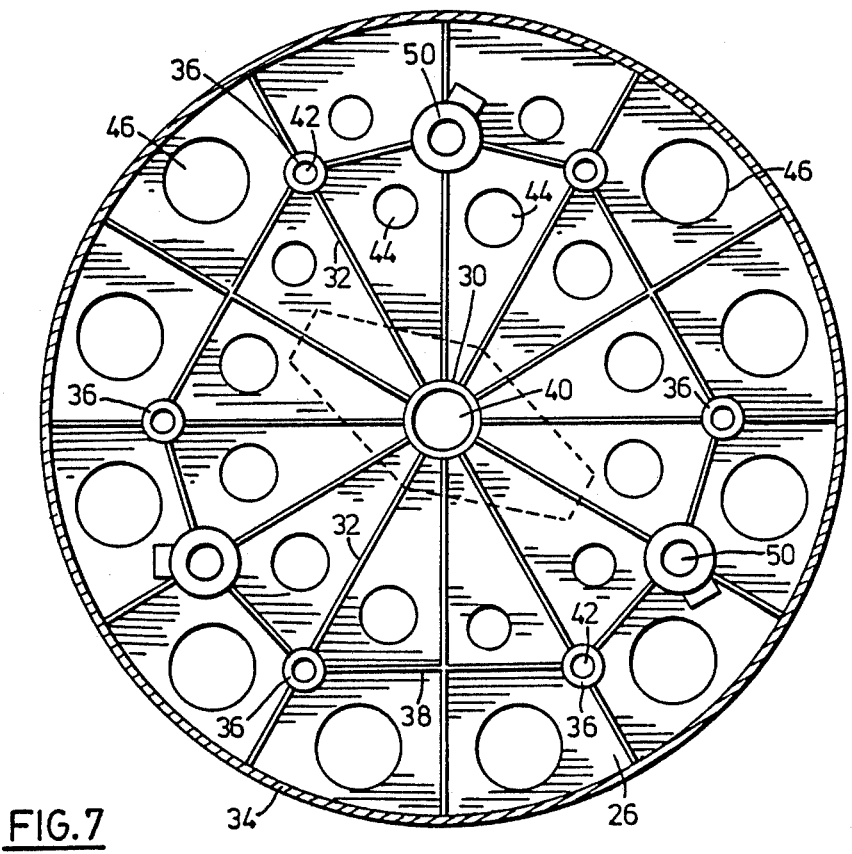
FIG. 7 is a front elevation of the grapple fixture with the front plate removed to expose the fabricated structure of the base.

In use, the cam arm assemblies 14 can be rotated about their axes 66 between the position shown in solid lines and the position shown in broken lines in FIG. 1, thereby causing the latch plate 82 to move between the positions shown in solid lines and in broken lines in FIG. 5. Thus by manipulating the cam arm assemblies, it is possible to move the latch plate between a released position and a latching position.

The EVA release mechanism 20 includes a housing 94 which is integrally formed with the boss 30. Roll load pins 126 are mounted on and project outwardly from the housing 94. A passage 96 extends through the housing 94. The passage 96 has enlarged threaded portions 98 at either end thereof and reduced diameter portions 100 opening into the through passage 40 of the boss 30. Release rods 102 are threadedly mounted in the passages 98. Retaining pins 104 are located in the passages 100 and extend into the through passage 40. The retaining pins have a length which is only slightly less than the diameter of the base portion 114 of the shaft 16. Each of the release rods 102 has a hexagonal head portion 106 and a flange 108.

The grapple shaft 16 has a circular rod portion 110, an enlarged head portion 112 and an enlarged base portion 114. The base portion 114 fits in a close fitting relationship within the bore 40. A through passage 116 is formed in the base portion 114 and is alignable with the passage 100 to receive the retaining pins 104.

To release the grapple shaft it is merely necessary to rotate the release rods 102 to centre one of the retaining pins 104 in the through passage 40 of the boss 30. Conversely to secure the grapple shaft, it is merely necessary to adjust the release rods 102 to locate the retaining pins 104 out of centre with the bore 40.

The front plate 22 of the base 12 is shaped to correspond substantially to the shape of the back plate with the exception that it has a flange 118 which projects outwardly therefrom. The flange 118 is supported by stiffening ribs 120. Target markings 122 and 124 are applied to the outer face of the flange 118 and center on the target rod 18.

Figure 3:
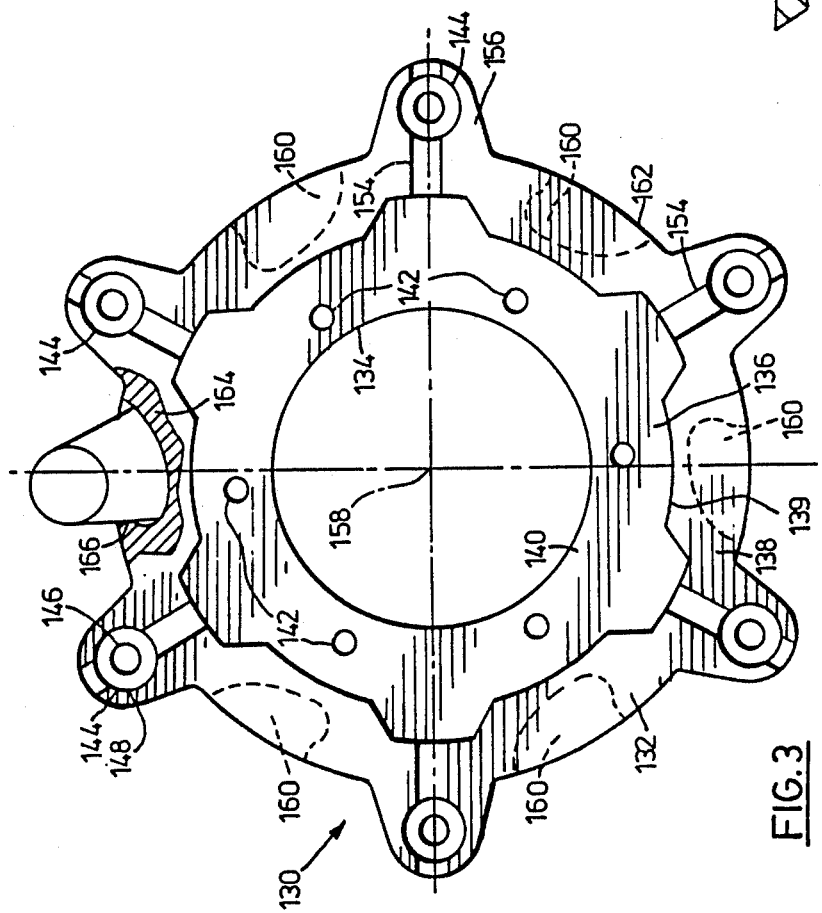
FIG. 3 is a front elevation of an adaptor plate according to an embodiment of the present invention.
Figure 6:
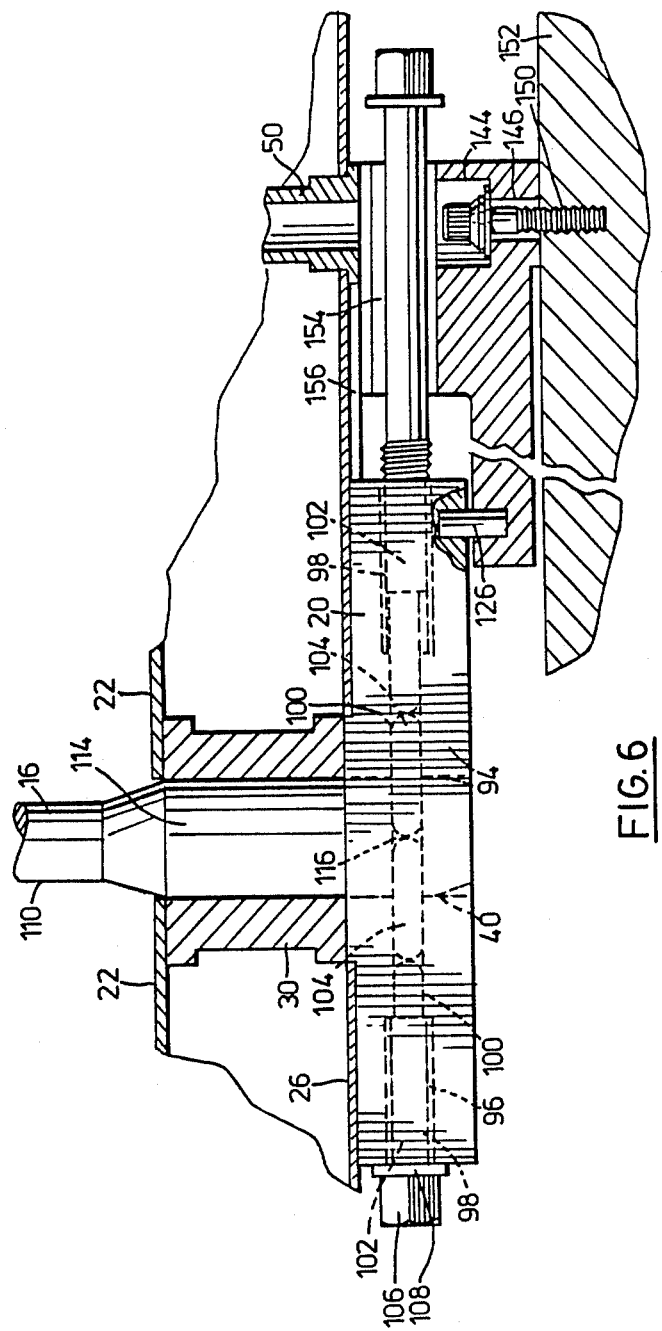
FIG. 6 is a sectional side view showing the location of the EVA release mechanism with respect to the adaptor plate.

With reference to FIG. 3 of the drawings, the reference numeral 130 refers generally to an adaptor plate suitable for mounting on a payload for the purposes of releaseably mounting the grapple fixture 10 with respect to a payload. The adaptor plate 130 consists of a body 132 which has a central passage 134 opening therethrough. A recess 136 is provided in the upper face 138. The recess 136 has a side wall 139 and a bottom wall 140. A plurality of roll load pin receiving openings 142 are formed in the bottom wall 140 at uniformly spaced circumferential intervals. The openings 142 are proportioned to receive the roll load pin 126 of the E.V.A. release mechanism 20. A plurality of mounting passages 144 are formed in the body 132 at uniformly spaced circumferential intervals. Mounting passages 144 have an enlarged portion 148 and a reduced portion 146. Mounting screws 150 (FIG. 6) serve to secure the adaptor with respect to a payload 152 and have their head portion located within the enlarged portion 148. Slots 154 extend inwardly from the front face 156 of the adaptor and radially from the central axis 158. The slots 154 are proportioned to receive the release rods 102 as shown in FIG. 6 of the drawings.

Latching receptacles 160 are formed in the side edge 162 of the adaptor plate. Each receptacle 160 includes an arcuate shaped portion 164 which extends to a shoulder 166 which serves to limit the rotational movement of the latch portion 90. Six of these notches are provided in the embodiments illustrated in FIG. 3 and are uniformly circumferentially spaced. As shown in FIG. 4 of the drawings, the receptacles 160 are proportioned to receive the latch portion 90 of the latch plate 82 in a close fitting sliding relationship. The adaptor plate may receive the grapple fixture in any one of six radial positions, thus, facilitating various positional options of the payload relative to the Remote Manipulator System and payload bay berthing requirements.

In use, at least one adaptor plate is mounted on each payload item by means of the mounting screws 150 so as to be readily accessible to a grapple fixture.

In order to mount the grapple fixture onto the adaptor plate, the operator can grasp the cam arms 62 and cause them to rotate about the axis 66 to assume the position shown in broken lines in FIG. 1. In this position, the latch portions 90 of the latch plates are arranged to provide sufficient clearance to permit the grapple fixture to be mounted on the adaptor. The grapple fixture 10 is aligned with the adaptor so that two load roll pins 126 are positioned in their respective receiving openings 142 and the release rods 102 are aligned with oppositely disposed slots 154. When the grapple fixture is located on the adaptor plate, it is latched into engagement with the adaptor plate by rotating the cam arms 62 back to the solid line position illustrated in FIG. 1. This action causes the latch portions 90 of the latch plates 82 to rotate into the latching receptacles 160 of the adaptor plate until the latch portion 90 engages the shoulder 166 of its associated latch receptacle to thereby releasably secure the grapple fixture with respect to the adaptor plate. Furthermore, this grapple fixture may be mounted with the adapter in any one of six radial positions relative to the fixed position of the adapter to provide choice of orientation of a captured payload relative to the shuttle orbitor when the payload is returned to the orbitor.

The grapple fixture can then function effectively as a grapple fixture for the payload with respect to which the grapple fixture is secured.

It will be apparent that the manipulation of the grapple fixture during the mounting of the grapple fixture onto the adaptor plate is such that all of the manipulations can be carried out by an operator grasping the cam actuator levels and these manipulations are such that they can be easily performed under EVA conditions.

Similarly, when the grapple fixture is no longer required, it can be removed from the adaptor plate simply by releasing the latch mechanisms by moving the cam arms from the solid line position shown in FIG. 1 to the broken line position and then merely withdrawing the grapple fixture from the adaptor plate.

The grapple fixture is designed to be used in association with an end effector of the type described in U.S. Pat. No. 4,105,241 such that the protrusions 65 which are formed at the outer peripheral edge 64 of each cam arm will mate with corresponding protrusions which are located with the end effector. The protrusions 65 are located on a radius R when the cam arms 14 are in the operable position shown in solid lines in FIG. 1. It follows that when a torque is to be transmitted from the end effector to the grapple fixture, the radius of the rotational force is the radius R and the radial force is applied along a circumference 67. The plane 69 is the plane of the rotational force and this plane is a tangent to the arc of curvature of the outer peripheral edge 64 at the point of intersection with the circumference 67. It follows that the resultant of the rotational force is applied along the line 71 at right angles to the plane of rotational force 69. The axis of rotation 66 is located at the intersection of the resultant force lines 71. As a consequence of this geometry, the rotational forces applied by the end effector to the cam arms 14 will not apply a torque to the cam arms 14 capable of causing rotation of the cam arms 14 away from the operable position shown in solid lines in FIG. 1.

From the foregoing, it will be apparent that the present invention provides a simple and inexpensive light weight grapple release fixture and adaptor plate, the use of which can serve to minimize the weight and cost of a shuttle payload without requiring a high level of dexterity for the purposes of connecting the grapple fixture to the adaptor plate. These and other advantages of the assembly of the present invention will be apparent to those skilled in the art.

I claim:
1. In a grapple fixture having a base which has a front face and a back face and a plurality of locating cam arms projecting from the front face of the base, said cam arms each have a proximal end located at said base and a distal end located at a probe which projects from the base beyond the distal end of the cam arm, the improvement wherein;
   (a) said cam arms are mounted for angular displacement on the base between a first position and a second position,
   (b) latch means located at the back face of said base, said latch means being connected to said cam arms so as to be rotatable with said arms into and out of a latch receptacle such that said latch means is operable from the front face of said base,
   (c) the distal ends of the cam arms being free of attachment to said probe so as to be free to be angularly displaced with respect to said base between said first and second positions.
2. A grapple fixture as claimed in claim 1 wherein, each of said cam arms is mounted for angular displacement about a first axis which extends perpendicular to said base, the proximal end of each arm having an outer peripheral edge which extends in an arc of curvature which is generated from said first axis such that rotational forces applied to the grapple fixture at the proximal ends of the cam arms will not apply a torque to the cam arms capable of causing rotation of the cam arms away from said second position.
3. A grapple fixture as claimed in claim 2, wherein the angular displacement occurs about a first axis which extends perpendicular to said front and back faces of said base and said latch means comprises a latch plate mounted on said cam arm and extending radially from said first axis in a spaced relationship with respect to said back face of said base to provide a latching gap between the latch plate and the back face of the base.
4. A grapple fixture as claimed in claim 1, wherein said base is a light weight fabricated base comprising a front plate, a back plate, a plurality of spacer ribs and a plurality of additional structural members extending between said front and back plates, said front plate, back plate and ribs having weight reducing openings formed therein.
5. A grapple fixture as claimed in claim 4, wherein said front plate, back plate, ribs and structural members are made from sheet metal and are secured to one another by being dip-braised.
6. A grapple fixture as claimed in claim 1, wherein the cam arms are mounted on the base such that said angular displacement occurs about an axis of rotation which is located at the intersection of the planes of the resultants of the rotational forces to be applied to the grapple fixture in use whereby substantially no torque load is applied to the arms tending to cause rotation about said axis by the rotational forces applied to the grapple fixture in use.
7. A grapple fixture assembly comprising;
   (a) an adaptor which is mountable on a payload and has an outer face and a side face which extends about the perimeter of the outer face, a latching notch formed in and extending laterally inwardly from said side face,
   (b) a grapple fixture comprising;
      (i) a base having a front face and a back face,
      (ii) a probe projecting from the front face of said base,
      (iii) a plurality of cam arms each having a distal end and a proximal end, the proximal end being mounted on the base for rotation about an axis which extends perpendicular to the front face of the base with respect to said base, the distal end of each cam arm being free of attachment to said probe,
      (iv) a latch plate mounted on the proximal end of each cam arm for rotation with its associate arm about said axis and being spaced outwardly from the back face of the base, to move into a latching notch of an adaptor when the outer face of the adaptor and the back face of the base are arranged in a face-to-face relationship thereby to releaseably secure the grapple fixture to the adaptor.
8. A grapple fixture assembly as claimed in claim 7, wherein a plurality of latching notches are formed at peripherally spaced intervals about the side face of the adaptor.
9. A grapple fixture assembly as claimed in claim 8, wherein a plurality of cam arms, each having latching plates, are provided on the base.
10. A grapple fixture assembly as claimed in claim 7, wherein six latching notches are formed at uniformly spaced intervals about the side face of the adaptor.

11. A grapple fixture assembly as claimed in claim 10, wherein three cam arms are provided on the grapple fixture, each cam arm having a latching plate.

12. A grapple fixture assembly as claimed in claim 7, wherein the cam arms are mounted on the base such that said axis is located at the intersection of the planes of the resultants of the rotational forces to be applied to the grapple fixture in usewhereby substantially no torque load is applied to the arms tending to cause rotation about said axis by the rotational forces applied to the grapple fixture in use.

13. In a grapple fixture having a base which has a front face and a back face and a plurality of locating cam arms projecting from the front face of the base, said cam arms each have a proximal end located at said base and a distal end located at a probe which projects from the base beyond the distal end of the cam arm, the improvement wherein;
 (a) said cam arms are mounted for angular displacement on the base between a first position and a second position,
 (b) latch means located at the back face of said base, said latch means being connected to said cam arms so as to be rotatable with said arms into and out of a latch receptacle such that said latch means is operable from the front face of said base,
 (c) said base being a light weight fabricated base comprising a front plate, a back plate, a plurality of spacer ribs and a plurality of additional structural members extending between said front and back plates, said front plate, back plate and ribs having weight reducing openings formed therein.

* * * * *